(12) United States Patent
Coscarella

(10) Patent No.: US 7,757,706 B2
(45) Date of Patent: Jul. 20, 2010

(54) BACKWATER VALVE ASSEMBLY WITH REMOVABLE VALVE MEMBER

(76) Inventor: Gabe Coscarella, 15703-64 Street NW, Edmonton, Alberta (CA) T5Y 2N5

( * ) Notice: Subject to any disclaimer, the term of this patent is extended or adjusted under 35 U.S.C. 154(b) by 275 days.

(21) Appl. No.: 11/873,350

(22) Filed: Oct. 16, 2007

(65) Prior Publication Data

US 2009/0095357 A1    Apr. 16, 2009

(51) Int. Cl.
*F16K 31/12* (2006.01)
(52) U.S. Cl. .............. 137/315.41; 137/315.16; 137/315.33; 137/327; 137/527.2
(58) Field of Classification Search .......... 137/15.08, 137/15.17, 15.18, 15.19, 315.16, 315.33, 137/315.41, 327, 527.2, 527.8
See application file for complete search history.

(56) References Cited

U.S. PATENT DOCUMENTS

| 353,888 | A | * | 12/1886 | Simpkins | 137/527.8 |
|---|---|---|---|---|---|
| 373,782 | A | * | 11/1887 | McHugh | 137/527.4 |
| 2,628,056 | A | | 2/1953 | Fuller | |
| 3,538,514 | A | | 11/1970 | Schimert | |
| 3,566,500 | A | | 3/1971 | Simon | |
| 3,626,148 | A | | 12/1971 | Woytowich | |
| 3,797,811 | A | | 3/1974 | Jullien | |
| 3,824,629 | A | | 7/1974 | Shiley | |
| 3,948,282 | A | | 4/1976 | Yano | |
| 4,064,902 | A | | 12/1977 | Swenson | |
| 4,311,163 | A | | 1/1982 | Langevin | |
| 4,391,289 | A | | 7/1983 | Adams | |
| 4,605,031 | A | | 8/1986 | Grund | |
| 4,961,444 | A | | 10/1990 | Morgan | |
| 5,020,567 | A | | 6/1991 | Proulx | |
| 5,469,881 | A | | 11/1995 | Phan | |
| 5,826,609 | A | | 10/1998 | Watts | |
| 6,029,684 | A | | 2/2000 | Watts | |
| 6,125,878 | A | | 10/2000 | Watts | |
| 6,186,164 | B1 | | 2/2001 | Pfeifer | |
| 6,679,283 | B1 | | 1/2004 | Coscarella | |
| 7,152,622 | B2 | * | 12/2006 | Scaramucci et al. | 137/527.2 |

* cited by examiner

*Primary Examiner*—John Rivell
*Assistant Examiner*—Jeremy S Baskin
(74) *Attorney, Agent, or Firm*—Christensen O'Connor Johnson Kindness PLLC

(57) ABSTRACT

A backwater valve assembly includes a valve housing, a valve member and a servicing tool. The valve housing has an internal ledge within its interior on which is positioned a retainer clip oriented in vertical alignment with a riser. The valve member has a first engagement of a two part engagement on one face and a mounting along a peripheral edge which includes transverse pins adapted to engage the retainer clip. The servicing tool includes a second engagement of the two part engagement at a working end of a shaft. The hook engages the hook receiver of the valve member during insertion and removal.

4 Claims, 6 Drawing Sheets

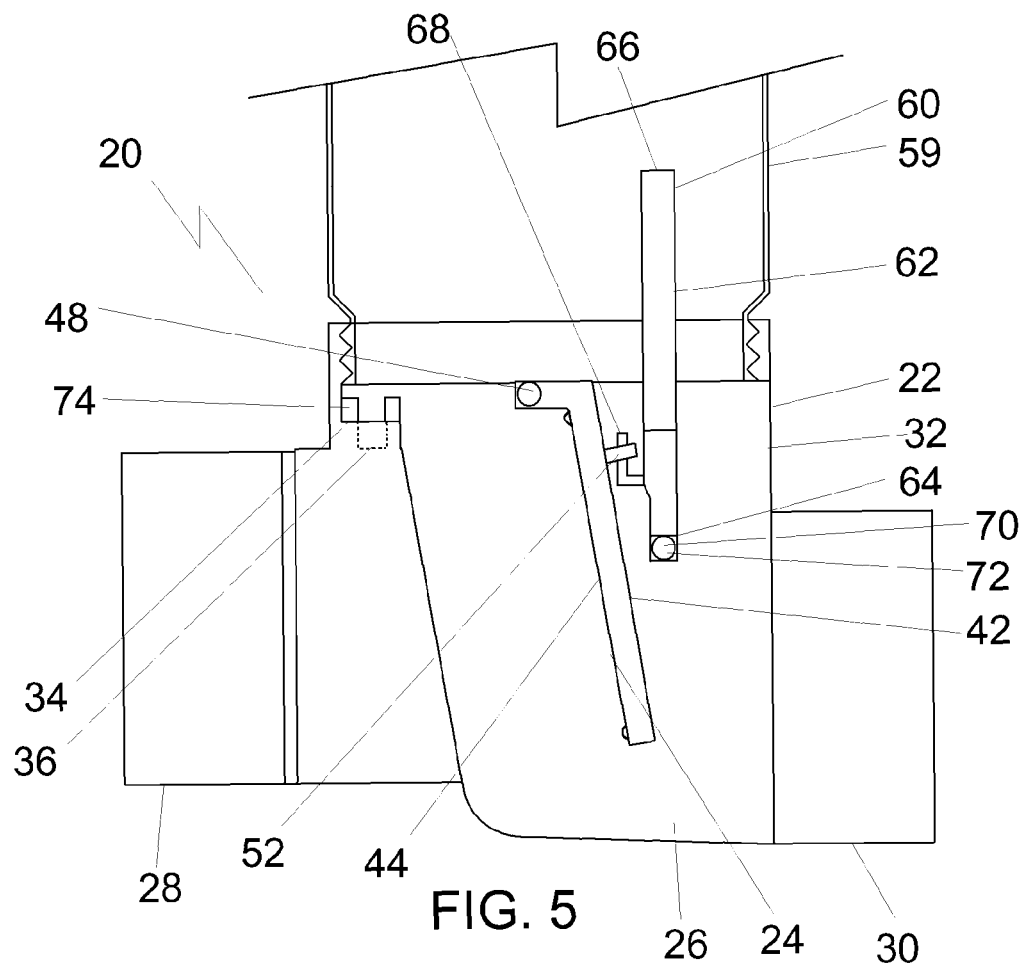
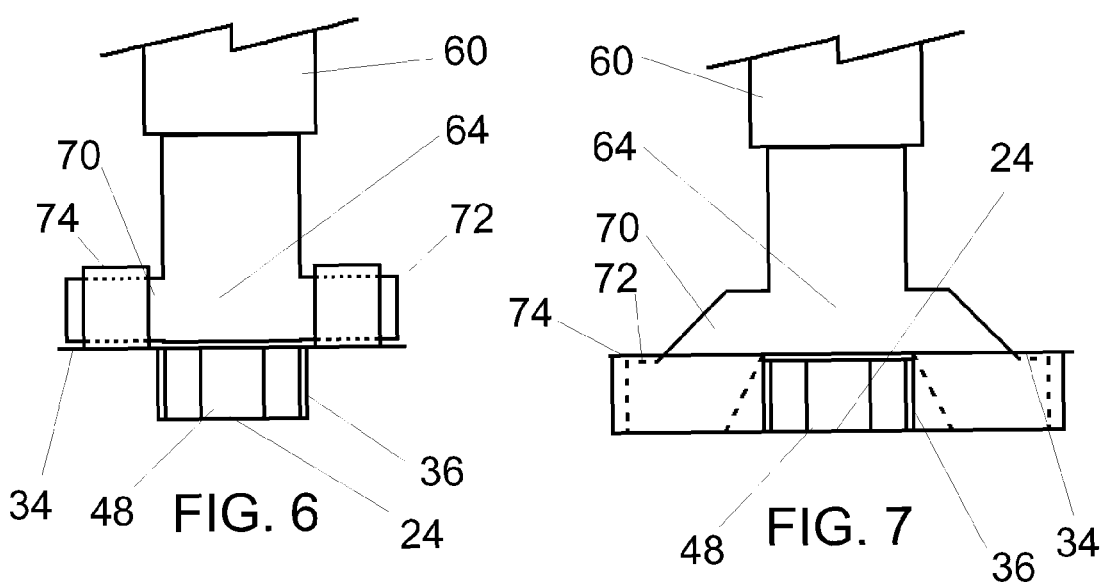

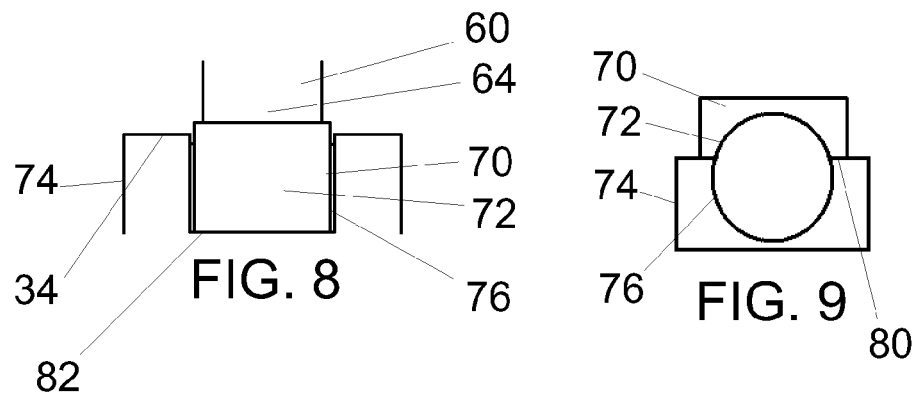
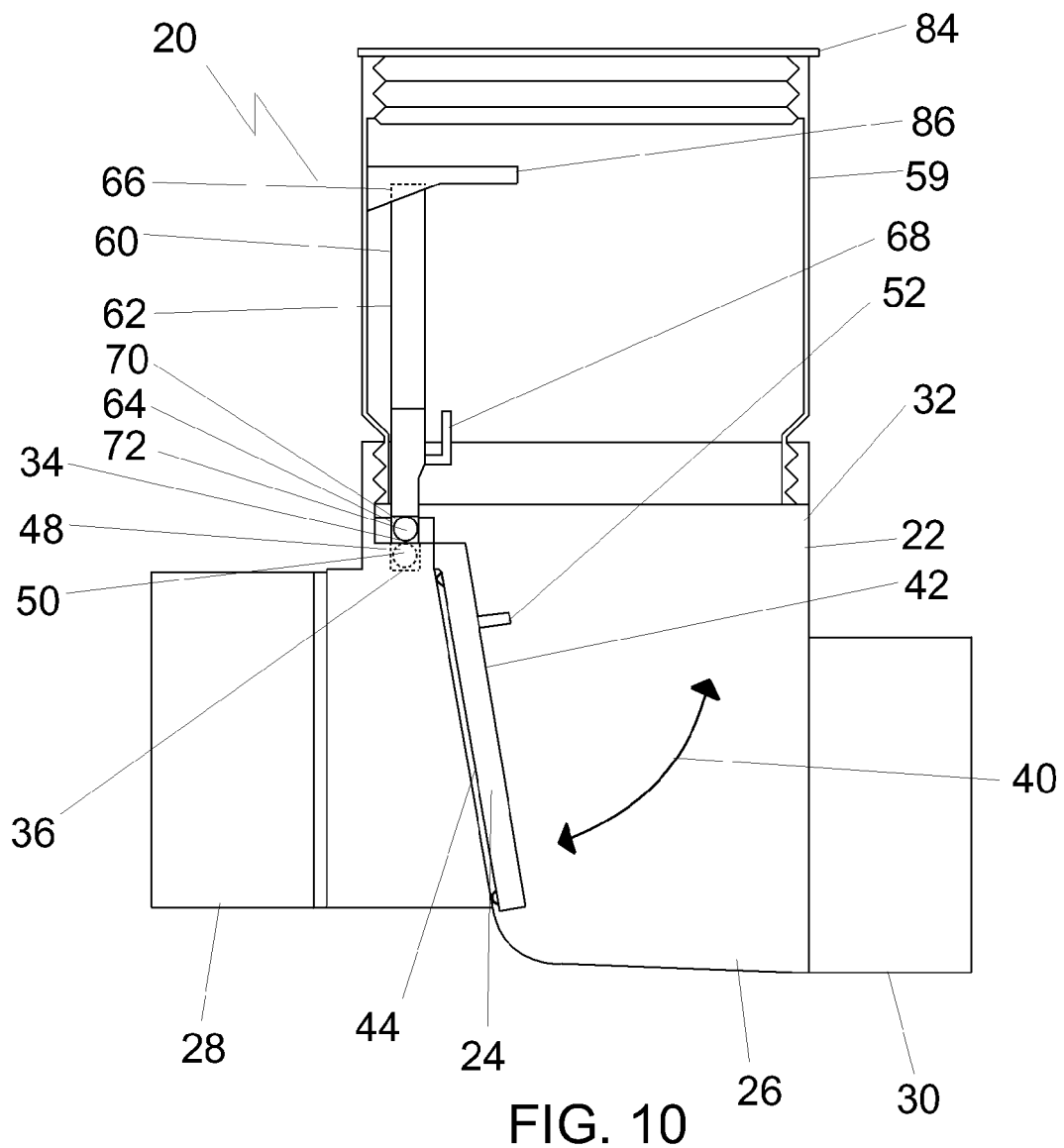

BACKWATER VALVE ASSEMBLY WITH REMOVABLE VALVE MEMBER

FIELD OF THE INVENTION

The present invention relates to a plumbing valve which, when prevents a reversal of flow.

BACKGROUND OF THE INVENTION

U.S. Pat. No. 6,679,283 (Coscarella 2004) discloses a backwater valve assembly with a removable valve member. Backwater valves prevent a reversal of flow. They are commonly buried too deep in the ground to access by hand for servicing. It is desirable for the valve member of the backwater valve to be removable for servicing and replacement at any depth. There may also be circumstances where there are extraordinary reasons why the removal of the valve member is desirable in order to intentionally allow a reversal of flow to occur.

SUMMARY OF THE INVENTION

According to the present invention there is provided a backwater valve assembly which includes a valve housing, a valve member and a servicing tool. The valve housing has an internal ledge within its interior on which is positioned a retainer clip oriented in vertical alignment with a riser. The valve member has a first engagement of a two part engagement on one face and a mounting along a peripheral edge which includes transverse pins adapted to engage the retainer clip. The servicing tool includes a second engagement of the two part engagement at a working end of a shaft. The second engagement engages the first engagement receiver of the valve member during insertion and removal.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 5 is a side section view of the embodiment of FIG. 1 shown with the valve member being removed using the servicing tool.

FIG. 6 is a front side view of an embodiment of a female receptacle coupling to a male member of a servicing tool.

FIG. 7 is a front side view of a further embodiment of a female receptacle coupling to a male member of a servicing tool.

FIG. 8 is a side view of the embodiment female receptacle coupling to a male member of a servicing tool shown in FIG. 6.

FIG. 9 is side view of an embodiment female receptacle coupling to a male member of a servicing tool using a snap-lock system.

FIG. 10 is a side section view of a backwater valve assembly shown with the servicing tool securing the valve member in the retainer clip.

DETAILED DESCRIPTION OF THE PREFERRED EMBODIMENT

Figure 1:
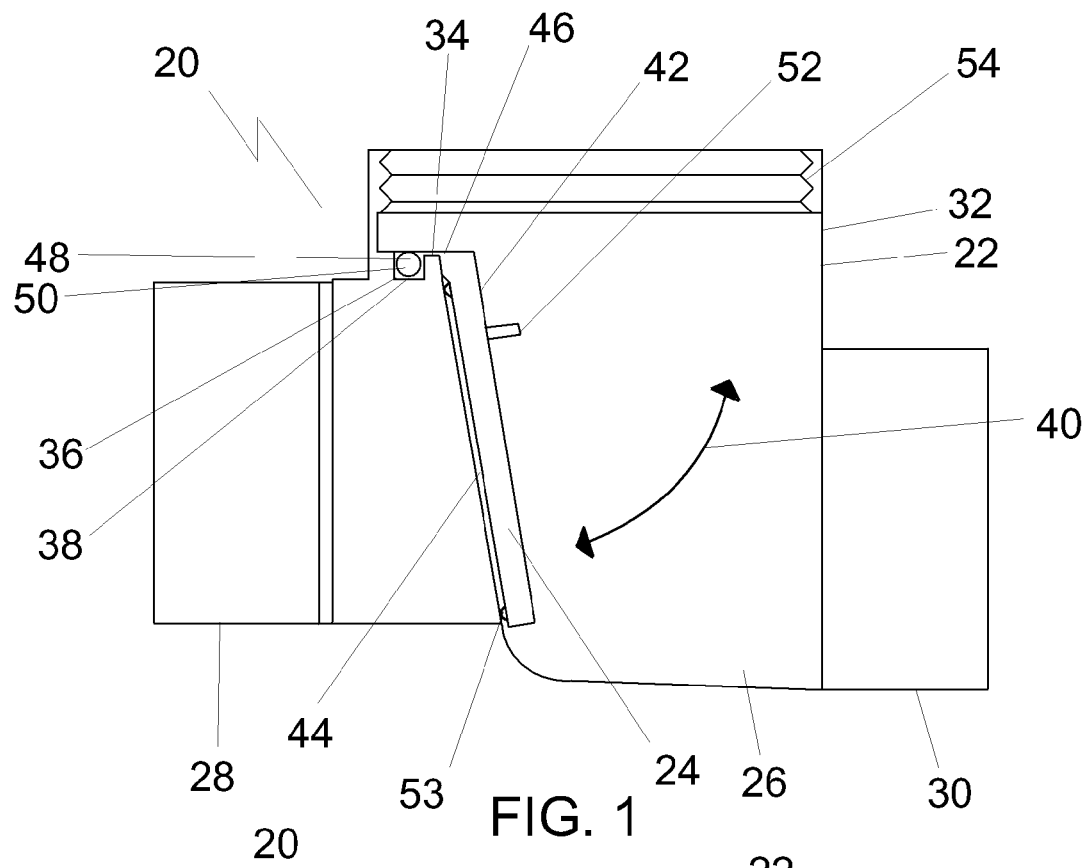
FIG. 1 is a side section view of an embodiment of a backwater valve assembly with a valve member.

The preferred embodiment, a backwater valve assembly generally identified by reference numeral 20, will now be described with reference to FIG. 1 through 12.

Figure 2:
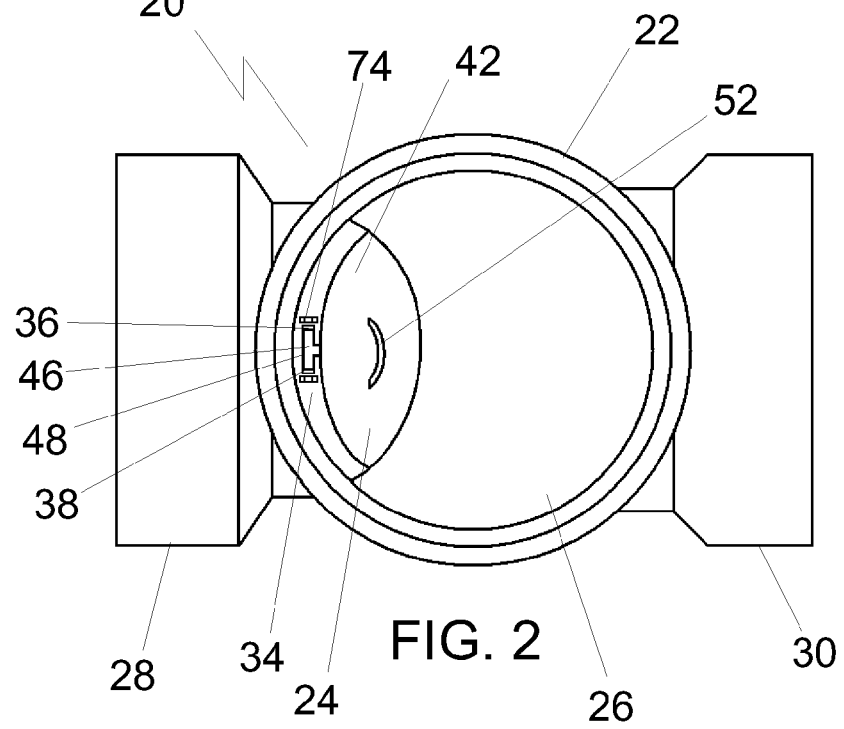
FIG. 2 is a top-down view of the embodiment of FIG. 1.

Structure and Relationship of Parts:

FIG. 1 shows backwater valve assembly 20, consisting of a housing 22 and a valve member 24. Housing 22 has an interior 26, an inlet 28 to interior 26, an outlet 30 to interior 26 and a riser 32 providing servicing access to interior 26. Housing 22 also contains an internal ledge 34 within interior 26, on which is positioned a retainer clip 36 oriented in vertical alignment with the riser 32. Retainer clip 36 may consist of a swivel guide slot 38, as shown in FIG. 1-2. Referring to FIG. 1, valve member 24 is adapted to be pivotally positioned across inlet 28 of housing 22 so that liquid flows in through inlet 28 and out through outlet 30, but any reversal of flow is prevented by the positioning of valve member 24. A path of movement 40 of valve member 24 through housing 22 is indicated. Valve member 24 consists of a first face 42, a second face 44, and a peripheral edge 46. Along peripheral edge 46 is a mounting 48 which includes transverse pins 50 designed to engage retainer clip 36, shown in more detail in FIG. 2. There is also a hook receiver 52 present on first face 42. Referring to FIG. 1, located around the circumferential edge of second face 44 is a sealing surface 53, designed to firmly seal valve member 24 to housing 22. Sealing surface 53 may consist of a rubber O-ring.

Referring to FIG. 1, riser 32 may have internal threading 54 for various piping attachments to couple with. A screw cap 56 is shown attached to internal threading 54 in FIG. 4. Screw cap 56 may include a peripheral ring 58 which functions to secure mounting 48 of valve member 24 within retainer clip 36. With screw cap 56 in place, valve member 24 is secure but still able to move through path of movement 40. Referring to FIG. 5, another possible piping attachment may include a pipe extension 59.

As shown in FIG. 5, backwater valve assembly 20 includes a servicing tool 60 adapted to insert and remove valve member 24 from internal ledge 34 and lift valve member 24 through riser 32 of housing 22. Servicing tool 60 has an elongated shaft 62 having a working end 64 and a locking end 66, with a hook 68 at working end 64 of the shaft. Hook 68 is adapted to engage hook receiver 52 of valve member 24. Working end 64 is adapted to secure valve member in place. Referring to FIG. 10, this can be accomplished by having working end 64 attaching to internal ledge 34 of housing 22, working end 64 being oriented in such a way that working end 64 prevents the removal of mounting 48 from retainer clip 36. Working end 64 of servicing tool 60 has a male member 70, which may include transverse attachment pins 72. Internal ledge 34 of housing 22 may include a female receptacle 74 (shown in FIGS. 2, 5, and 10), such that male member 70 is insertable into female receptacle 74. Referring to FIG. 8, female receptacle 74 may consist of slots 76, each of which receives a transverse attachment pin 72 of male member 70. Transverse attachment pins 72 may be cylindrical, or any other shape that is required to fit into female receptacle 74. Referring to FIG. 10, female receptacle 74 is oriented such that when male member 70 is inserted into female receptacle 74, mounting 48 of valve member 24 is secured in retainer clip 36. This may be accomplished by working end 64 of servicing tool 60 exerting a force upon valve member 24 urging transverse pins 50 into engagement with retainer clip 36.

FIG. 6 shows the preferred embodiment of working end 64 securing mounting 48 of valve member in retainer clip 36. Slots 76 (as shown in FIG. 8) of female receptacle 74 are positioned on internal ledge 34 of housing 22, such that they do not interfere with mounting 48 of valve member 24 inserting into retainer clip 36 of internal ledge 34. Slots 76 may secure transverse attachment pins 72 using a snap-lock system, as shown in FIG. 9. Snap-lock system may consist of slot 76 which has a shape designed to accept cylindrical transverse attachment pins 72. This may be accomplished by providing slots 76 which having overlapping lips 80 in place to secure transverse attachment pins 72 into slots 76. This way, transverse attachment pin 72 is snapped into place. Alternatively, transverse attachment pin 72 may be inserted into a slot without using a snap-lock design, and held in place by locking end 66 of servicing tool 60.

FIG. 7 shows an alternative embodiment of working end 64 securing mounting 48 of valve member in retainer clip 36. Slots 76 are positioned on internal ledge 34 of housing 22, such that they are slotted indents lying along the same plane as retainer clips 36, similar to that shown in FIG. 8. Referring to FIG. 7, female receptacle 74 is oriented such that it does not interfere with mounting 48 of valve member 24 inserting into retainer clip 36 of internal ledge 34. Transverse attachment pins 72 of male member 70 are designed such that they can engage slots 76 (similar to that shown in FIG. 8), and also prevent the removal of mounting 48 of valve member 24 from retainer clip 36. Slots 76 may secure transverse attachment pins 72 using a snap-lock system, similar to that shown in FIG. 9.

FIG. 10 shows a backwater valve assembly 20, with pipe extension 59 attached to riser 32. Pipe extension 59 may be sealed by a cap 84 at the end opposite to that attached to riser 32. Male member 70 of servicing tool 60 is inserted into female receptacle 74 of internal ledge 34, securing mounting 48 of valve member 24 into retainer clip 36. Locking end 66 of servicing tool 60 is then attached to an internal pipe locking mechanism 86, which secures servicing tool 60 in place. In this embodiment pipe locking mechanism 86 is a snap-down lever.

Figure 11:
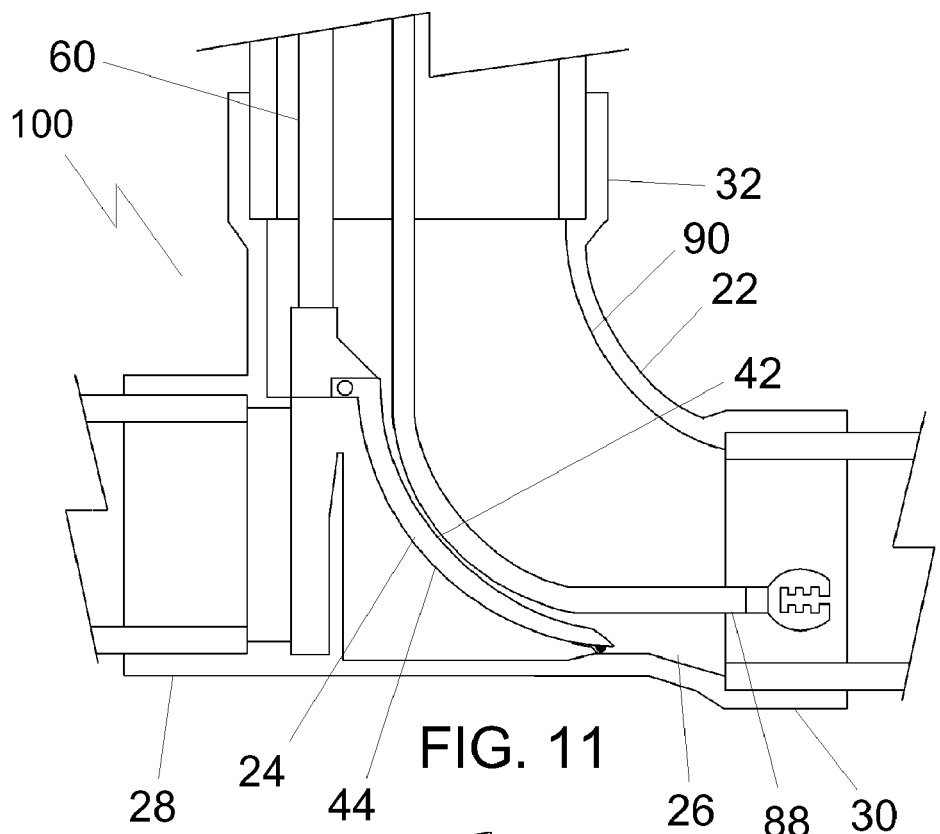
FIG. 11 is a side section view of an embodiment of a backwater valve assembly with a concave valve member guiding a servicing snake from the riser.
Figure 12:
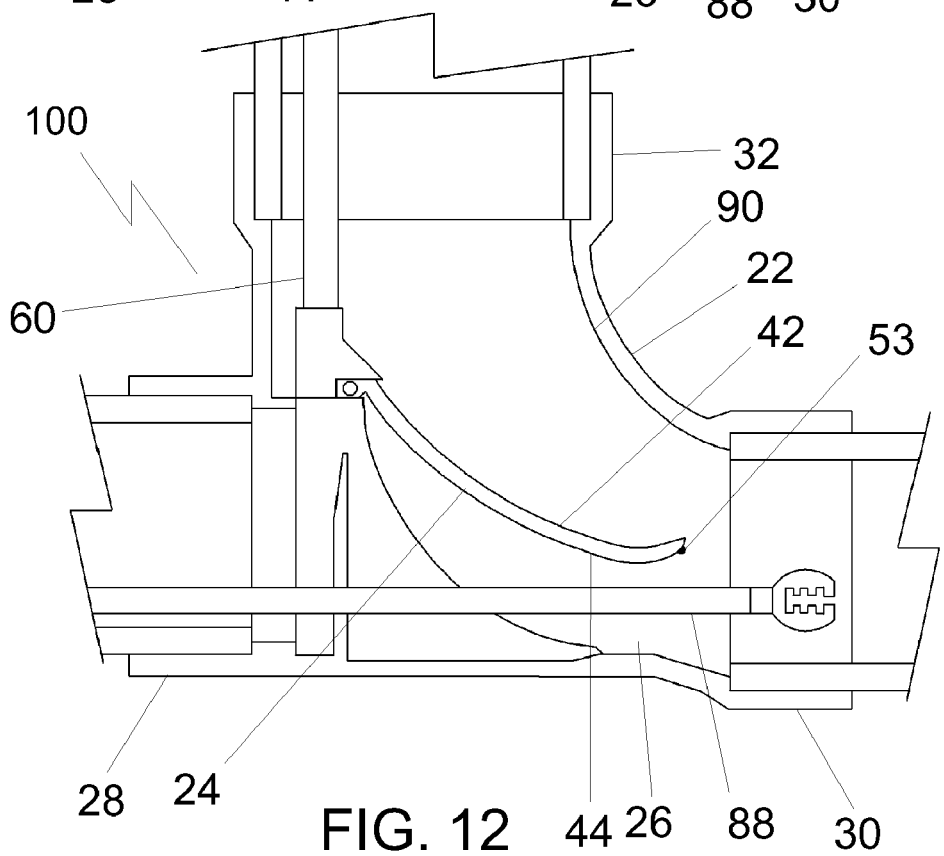
FIG. 12 is a side section view of the embodiment of FIG. 11 guiding a servicing snake from the inlet.

FIG. 11-12 show a backwater valve assembly 100, similar in structure to backwater valve assembly 20, backwater valve assembly 100 having a valve member 24. Valve member has a first face 42 and a second face 44. Referring to FIG. 11, first face 42 of valve member 24 has a concave curvature adapted to guide a servicing snake tool 88 inserted through riser 32 toward outlet 30. A curved surface 90 is present as shown, curved surface 90 being located between riser 32 and outlet 30. Referring to FIG. 12, second face 44 of valve member 24 has a convex curvature adapted to facilitate deflection of valve member 24 in response to a force exerted by servicing snake tool 88 inserted into interior 26 of valve housing 22 through inlet 28.

Figure 3:
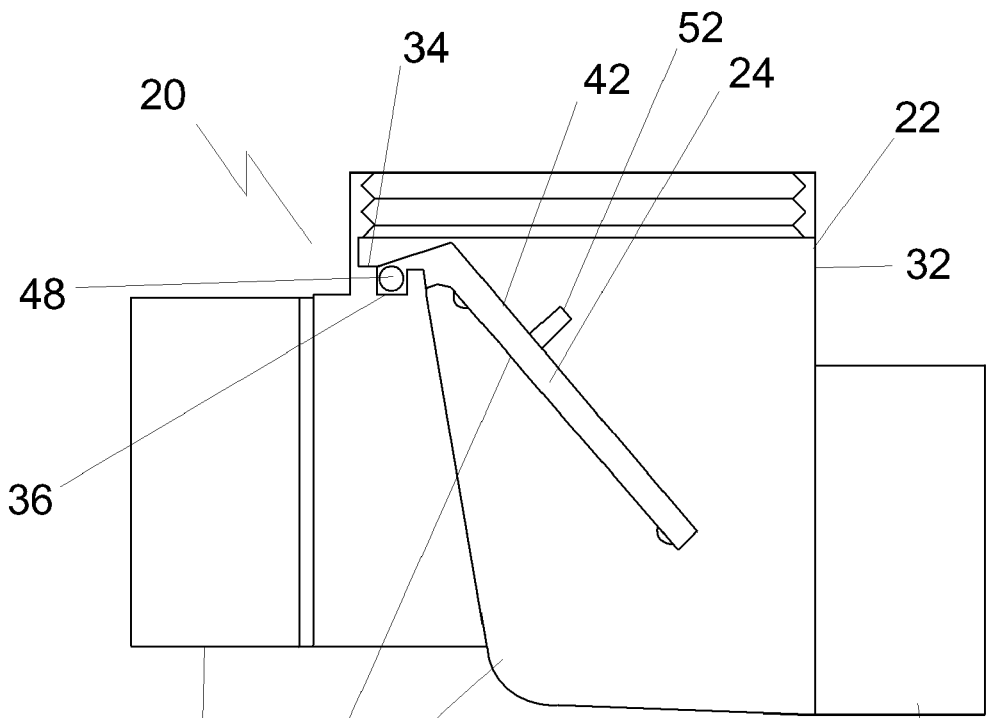
FIG. 3 is a side section view of the embodiment of FIG. 1 with the valve member in the open position.

Operation:

Under a positive water pressure from inlet 28, valve member 24 is pushed open and allows water to travel through housing 22 to outlet 30, as shown in more detail in FIG. 3. This shows valve member 24 in the open position. Under negative water pressure from inlet 28, valve member 24 closes, preventing any backflow of water into inlet 28, by sealing inlet 28 from interior 26. Valve member 24 is shown in the closed position in any of FIG. 1, 4 or 10.

Plumbing systems, such as the one that this apparatus may be a part of, often require servicing. Because this might require valve member 24 to be removed from housing 22, servicing tool 60 is provided to accomplish this purpose, as shown in FIG. 10. Referring to FIG. 5, hook 68 is adapted to engage hook receiver 52 of valve member 24, and lift mounting 48 of valve member 24 out of contact with retainer clip 36. With hook 68 engaged in hook receiver 52, valve member 24 can be removed entirely from housing 22. Pipe extension 59 may be connected to riser 32 of housing 22, and may be of considerable length. In this case, in order for servicing tool 60 to be able to remove valve member 24 from housing 22, elongated shaft 62 must be of a sufficient length. This way valve member 24 may be easily removed without the need for a complete disassembly of the system.

Figure 4:
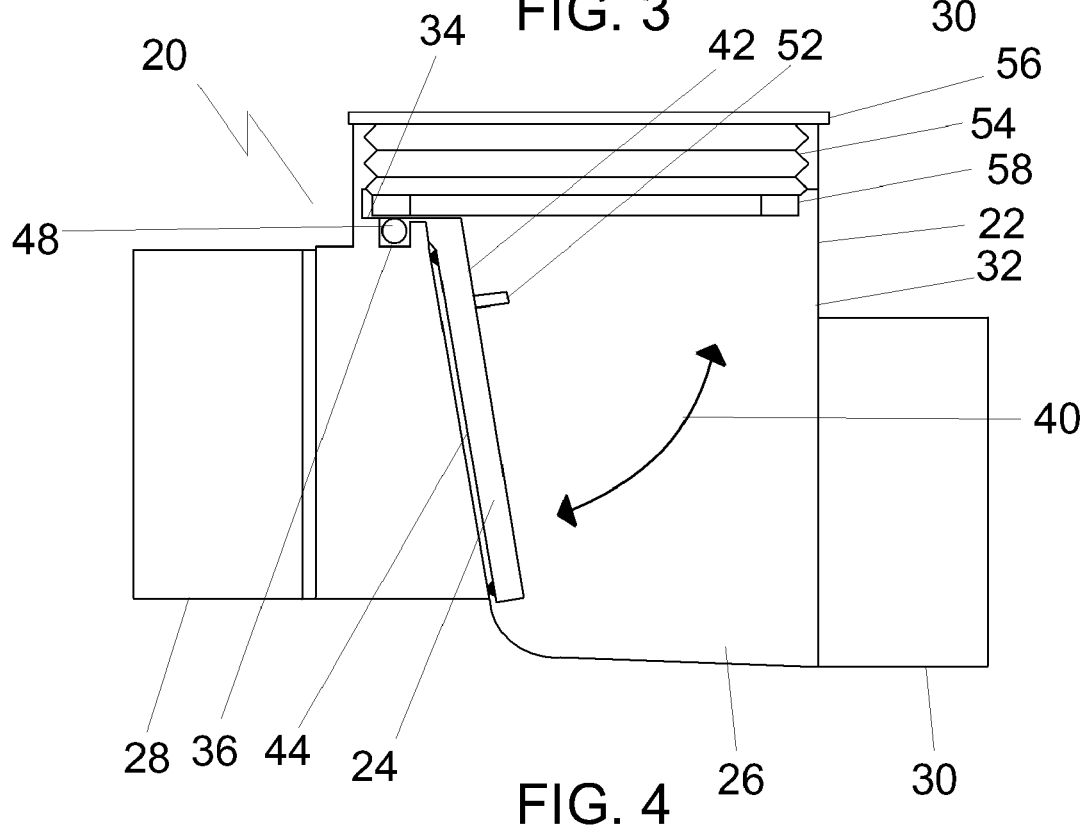
FIG. 4 is a side section view of the embodiment of FIG. 1 with a screw-cap securing the valve member in the retainer clip.

Referring to FIG. 1, retainer clip 36 provides a mechanism for valve member 24 to attach to and move over path of movement 40, but it may or may not secure valve member 24 to a sufficient extent. In order to ensure that valve member 24 remains secured to retainer clip 36, but is still able to function properly as a valve, some means of securing mounting 48 in retainer clip 36 is required. As shown in FIG. 4, this may be accomplished by attaching screw cap 56 to internal threading 54 of riser 32. Peripheral ring 58 of screw cap 56 is oriented in such a way that it secures valve member 24 in retainer clip 36, but also allows valve member 24 to swing over path of movement 40 in response to different water pressures from inlet 28. Alternatively, working end 64 of servicing tool 60 is able to secure valve member 24 in place, as shown in FIG. 10. Male member 70 is inserted into female receptacle 74, which secures valve member 24 in place by preventing mounting 48 from being removed from retainer clip 36. In order to ensure that male member 70 remains inserted into female receptacle 74, servicing tool 60 must be firmly locked in place by attaching locking end 66 to internal pipe locking mechanism 86. When servicing tool 60 is firmly locked in place, valve member 24 is able to move over path of movement 40 in response to varying water pressures from inlet 28. This apparatus also accomplishes the purpose of storing servicing tool 60 until needed for use. This is advantageous because servicing tool 60 always remains nearby and easy to find when valve member 24 must be removed again, as described previously.

Variations:

Referring to FIG. 1, backwater valve assembly 20 describes an apparatus where first face 42 and second face 44 of valve member 24 are flat. Alternatively, as in the embodiment of backwater valve assembly 100 shown in FIG. 11-12, first face 42 may have convex curvature, and second face 44 may have concave curvature. In some cases where servicing must be performed on the system and in the direction of outlet 30, the curvature of first face 42 and second face 44 allow servicing snake tool 88 to be used, without necessitating the removal of valve member 24 from housing 22. Referring to FIG. 11, if servicing snake tool 88 is inserted from riser 32, servicing snake tool 88 is deflected towards outlet 30 as it contacts the curvature of first face 42 of valve member 24. Upon withdrawal, servicing snake tool 88 contacts curved surface 90, and is gently deflected as it travels out through riser 32. This is advantageous in that it avoids potential damage that could be incurred by housing 22 in the case where servicing snake tool 88 may accidentally become hooked on various ridges or outcroppings within housing 22. Repairing these damages might require draining and dismantling the system in order to repair it properly.

Referring to FIG. 12, if servicing snake tool 88 is inserted from inlet 28, servicing snake tool 88 contacts the curvature of second face 44, and gently pushes open valve member 24, allowing servicing snake tool 88 to pass through towards outlet 30. In this case, because of the convex curvature of second face 44, servicing snake tool 88 can be withdrawn back through inlet 28 without coming into contact with sealing surface 53. This is advantageous in that it avoids potential damage that could be incurred by sealing surface 53, which would inhibit the proper functioning of valve member 24.

Figure 13:
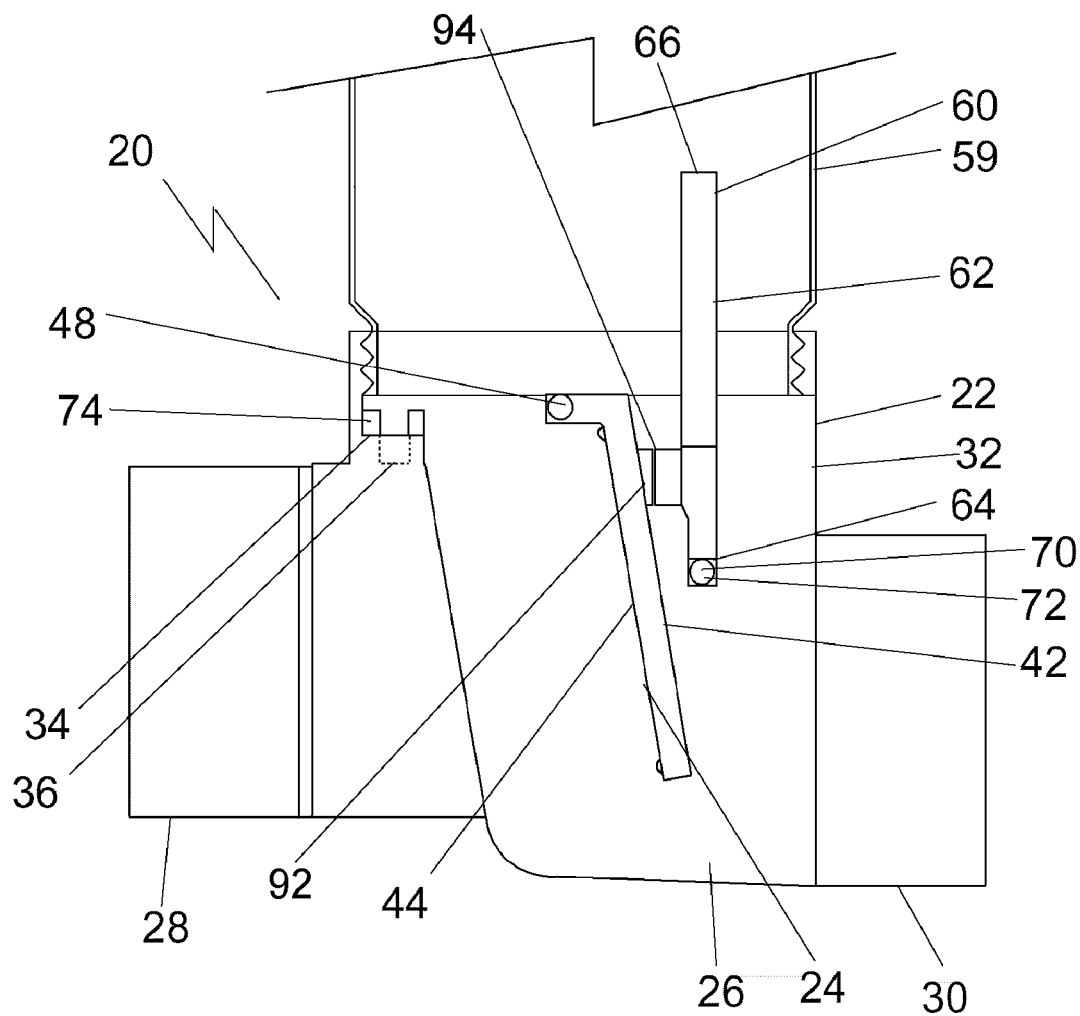
FIG. 13 is a side view in section of the embodiment of FIG. 1 shown with the valve member being removed using magnets.

While a hook and hook receiver arrangement has been depicted above, other two part engagement arrangements may also be used. For example, referring to FIG. 13, first and second magnets 92 and 94 may be used, with first magnet 92 attached to second face 44 of valve member 24, and second magnet 94 is attached to working end 64 of servicing tool 60.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A backwater valve assembly comprising:
   a valve housing having:
      an interior, an inlet to the interior, an outlet to the interior, and a riser providing servicing access to the interior;
      the housing having an internal ledge within the interior on which is positioned a retainer clip oriented in vertical alignment with the riser;
   a valve member adapted to be pivotally positioned across the inlet of the housing so that liquid flows in through the inlet and out through the outlet, but any reversal of flow is prevented by the positioning of valve member, the valve member having:
      a first face, a second face, and an peripheral edge;
      a mounting along the peripheral edge which includes transverse pins adapted to engage the retainer clip; and
      a first engagement of a two part engagement on the first face;
   a servicing tool adapted to insert and remove the valve member through the rise of the valve housing, the tool having:
      an elongated shaft having a working end; and
      a second engagement of the two part engagement at the working end of the shaft, the second engagement being adapted to engage the first engagement of the valve member; and
   a pipe extension extending vertically from the riser of the valve housing, the pipe extension having an internal locking mechanism for securing the servicing tool within the pipe extension, the servicing tool being used to maintain the transverse pins of the valve member engaged with the retainer clip of the valve housing, the servicing tool being secured against axial movement within the pipe extension by the internal locking mechanism.

2. A backwater valve assembly comprising:
   a valve housing having:
      an interior, an inlet to the interior, an outlet to the interior, and a riser providing servicing access to the interior;
      the housing having an internal ledge within the interior on which is positioned a retainer clip oriented in vertical alignment with the riser;
   a valve member adapted to be pivotally positioned across the inlet of the housing so that liquid flows in through the inlet and out through the outlet, but any reversal of flow is prevented by the positioning of valve member, the valve member having:
      a first face, a second face, and an peripheral edge;
      a mounting along the peripheral edge which includes transverse pins adapted to engage the retainer clip; and
      a first engagement of a two part engagement on the first face;
   a servicing tool adapted to insert and remove the valve member through the rise of the valve housing, the tool having:
      an elongated shaft having a working end; and
      a second engagement of the two part engagement at the working end of the shaft, the second engagement being adapted member,
   wherein the working end of the tool has a depending male member and the internal ledge of the interior of the housing includes a female receptacle, such that the male member is insertable into the female receptacle to exert a force upon the valve member to urge the transverse pins into engagement with the retainer clip.

3. The backwater valve assembly as defined in claim 2, wherein the first face of the valve member has a concave curvature adapted to guide a snake inserted through the rise toward the outlet.

4. The backwater valve assembly as defined in claim 3, wherein the second face of the valve member has a convex curvature adapted to facilitate deflection of the valve in response to a force exerted by a snake inserted into the interior of the valve housing through the inlet.

* * * * *

UNITED STATES PATENT AND TRADEMARK OFFICE
CERTIFICATE OF CORRECTION

PATENT NO. : 7,757,706 B2  Page 1 of 1
APPLICATION NO. : 11/873350
DATED : July 20, 2010
INVENTOR(S) : G. Coscarella It is certified that error appears in the above-identified patent and that said Letters Patent is hereby corrected as shown below:

| COLUMN | LINE | ERROR |
| --- | --- | --- |
| 5 (Claim 1, | 46 line 13) | "and an peripheral edge;" should read --and a peripheral edge;-- |
| 6 (Claim 2, | 26 line 13) | "and an peripheral edge;" should read --and a peripheral edge;-- |
| 6 (Claim 2, | 38 line 25) | "being adapted member" should read --being adapted to engage the first engagement of the valve member-- |

Signed and Sealed this

Nineteenth Day of October, 2010

David J. Kappos
*Director of the United States Patent and Trademark Office*